United States Patent
Boaz

[11] Patent Number: 6,136,427
[45] Date of Patent: Oct. 24, 2000

[54] GLASS PANEL ASSEMBLY

[75] Inventor: Premakaran T. Boaz, Livonia, Mich.

[73] Assignee: Ford Motor Company, Dearborn, Mich.

[21] Appl. No.: 09/188,139

[22] Filed: Nov. 9, 1998

[51] Int. Cl.[7] .................................................. B32B 3/26
[52] U.S. Cl. ........................... 428/321.5; 428/46; 428/68; 428/26; 428/194; 428/321.1; 428/425.6
[58] Field of Search .................................. 428/46, 68, 26, 428/194, 321.1, 321.5, 425.6

[56] References Cited

U.S. PATENT DOCUMENTS

| | | | |
|---|---|---|---|
| 3,879,241 | 4/1975 | Butler | 156/108 |
| 4,562,676 | 1/1986 | Kruschwitz . | |
| 4,627,145 | 12/1986 | Niemanns . | |
| 4,894,972 | 1/1990 | Endoh et al. . | |
| 4,994,315 | 2/1991 | Schreiber et al. . | |
| 5,062,248 | 11/1991 | Kunert . | |
| 5,085,021 | 2/1992 | Kunert . | |
| 5,137,770 | 8/1992 | Rothe et al. . | |
| 5,413,397 | 5/1995 | Gold . | |
| 5,478,132 | 12/1995 | Gold . | |
| 5,544,458 | 8/1996 | Allison et al. . | |
| 5,620,648 | 4/1997 | Volkmann et al. . | |
| 5,822,932 | 10/1998 | Agrawal | 52/597 |
| 5,864,996 | 2/1999 | veldman | 52/240 |

FOREIGN PATENT DOCUMENTS

| | | |
|---|---|---|
| 0 128 086 A2 | 5/1984 | European Pat. Off. . |
| 0 312 496 A1 | 10/1988 | European Pat. Off. . |
| 0 351 369 A1 | 7/1989 | European Pat. Off. . |
| 0351369 | 1/1990 | European Pat. Off. . |
| 0 614 775 A1 | 1/1994 | European Pat. Off. . |
| WO 94/04383 | 3/1994 | WIPO . |

*Primary Examiner*—Blaine Copenheaver
*Assistant Examiner*—Norca L. Torres
*Attorney, Agent, or Firm*—Charles H. Ellerbrock

[57] ABSTRACT

A glass panel assembly for a motor vehicle includes a glass panel and a membrane mounted to one side of the glass panel. The glass panel assembly also includes an adhesive disposed between the membrane and the glass panel, whereby the membrane is ruptured to allow the adhesive to secure the glass panel directly to vehicle structure.

16 Claims, 4 Drawing Sheets

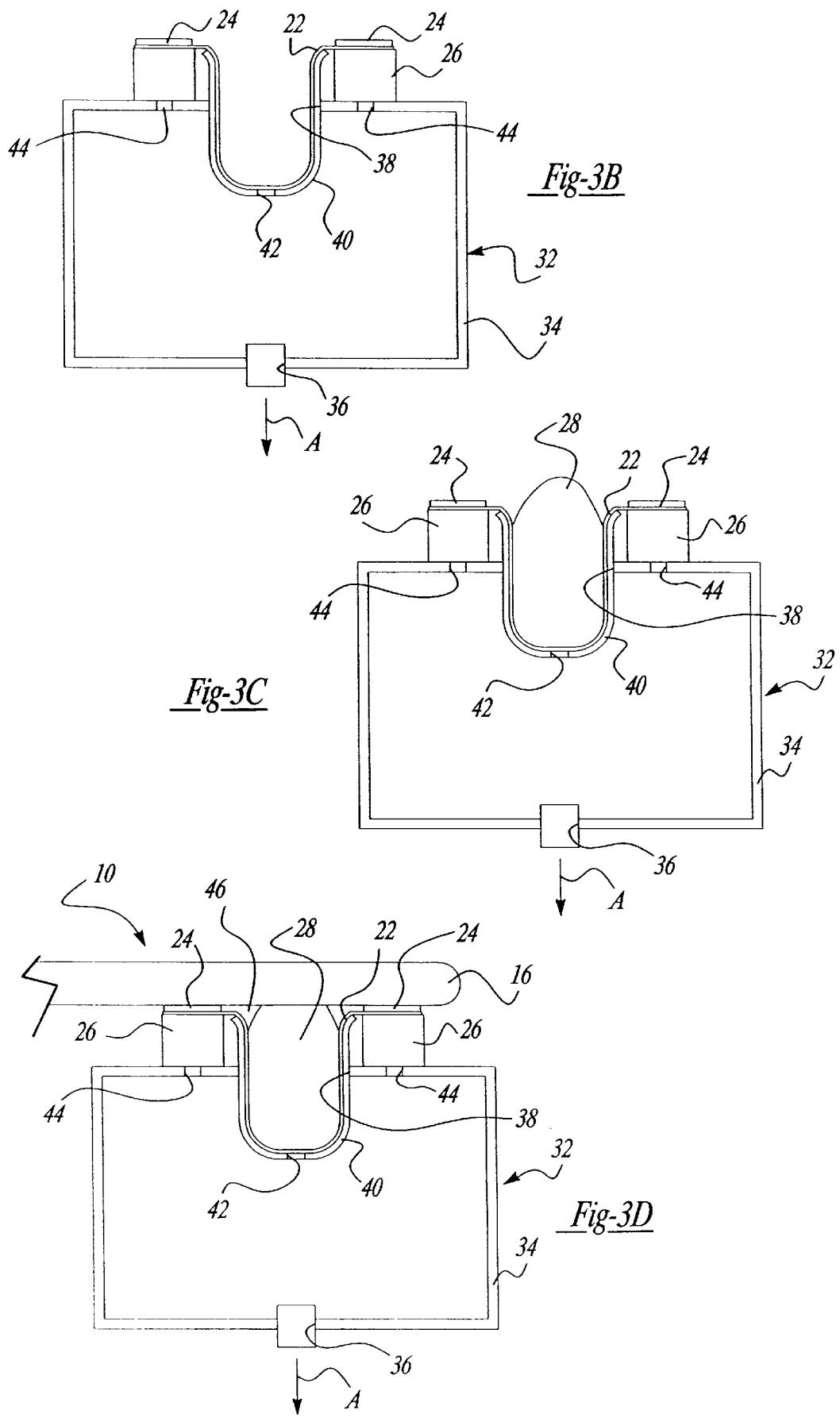

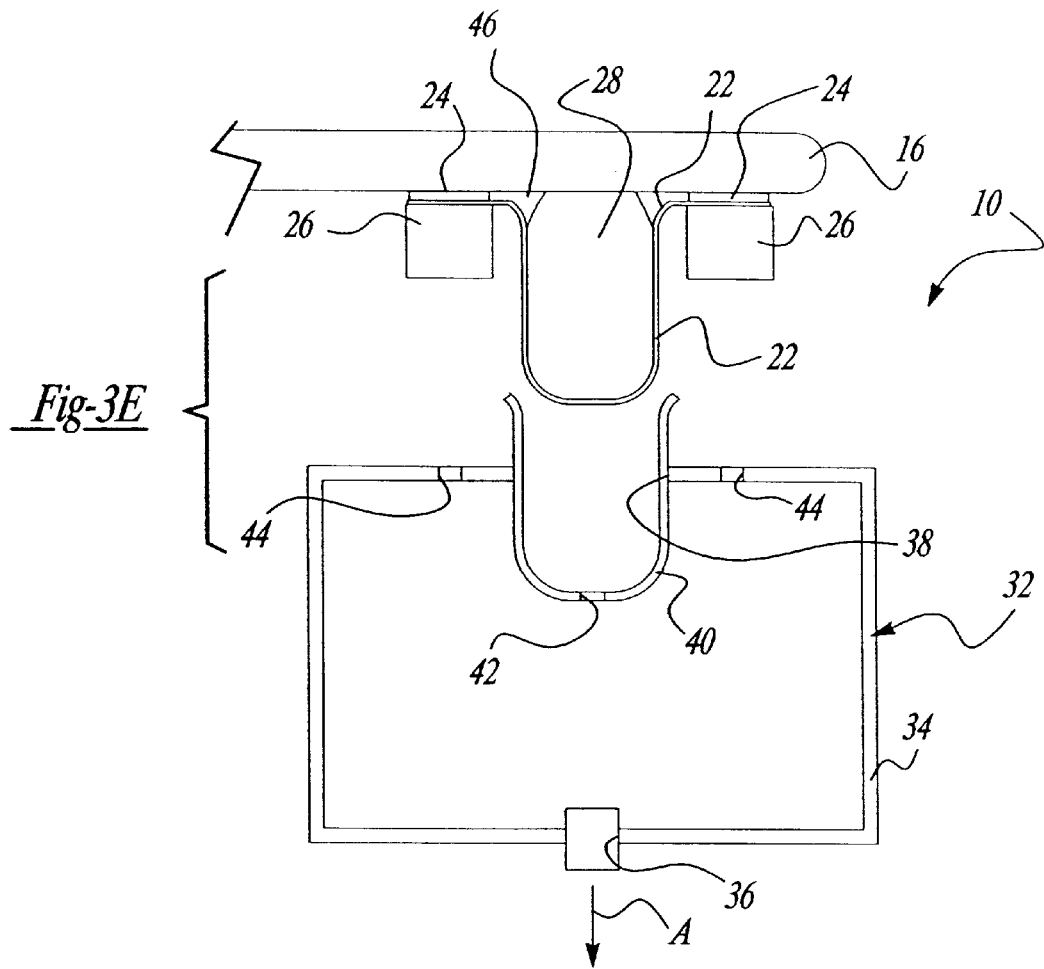
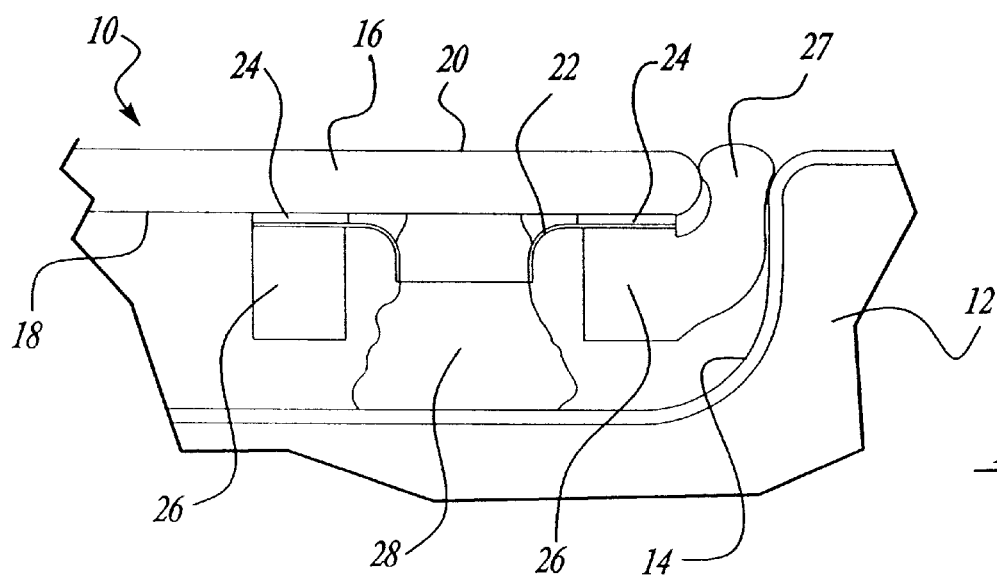

GLASS PANEL ASSEMBLY

BACKGROUND OF THE INVENTION

1. Field of the Invention

The present invention relates generally to glass panels for vehicles and, more specifically, to a glass panel assembly for a motor vehicle.

2. Description of the Related Art

It is known to provide a glass panel assembly for an opening on a motor vehicle. The glass panel assembly typically includes a glass panel and a strip of polymerized urethane disposed about a perimeter of the glass panel. The glass panel assembly also includes a seal disposed in a groove of the strip to contact a body panel of the motor vehicle. The glass panel assembly also includes a plurality of mounting studs extending from the strip and generally perpendicular to the glass panel. The mounting studs are threaded and extend through apertures in the body panel and secured with a threaded nut.

Although these glass panel assemblies have worked well, they suffer from the disadvantage that they have a relatively large number of parts and are labor intensive and costly. Another disadvantage of these glass panel assemblies is that the assembly plants have to apply urethane and include the urethane process in their assembly line.

SUMMARY OF THE INVENTION

Accordingly, the present invention is a glass panel assembly for a motor vehicle including a glass panel and a membrane mounted to one side of the glass panel. The glass panel assembly also includes an adhesive disposed between the membrane and the glass panel, whereby the membrane is ruptured to allow the adhesive to secure the glass panel directly to vehicle structure of the motor vehicle.

One advantage of the present invention is that an improved glass panel assembly is provided for a motor vehicle. Another advantage of the present invention is that the glass panel assembly is provided with a membrane that allows pre-assembly of an adhesive to a glass panel prior to shipment to an assembly plant. Yet another advantage of the present invention is that the glass panel assembly allows the assembly plant to eliminate the urethane process from the assembly line. Still another advantage of the present invention is that the glass panel assembly simplifies the assembly procedure and reduces labor, parts and cost.

Other features and advantages of the present invention will be readily appreciated as the same becomes better understood after reading the subsequent description when taken in conjunction with the accompanying drawings.

BRIEF DESCRIPTION OF THE DRAWINGS

FIGS. 3A through 3E are elevational views of a method, according to the present invention, of making the glass panel assembly of FIG. 2.

FIG. 4 is a fragmentary elevational view of another embodiment, according to the present invention, of the glass panel assembly of FIG. 2.

DESCRIPTION OF THE PREFERRED EMBODIMENT(S)

Figure 1:
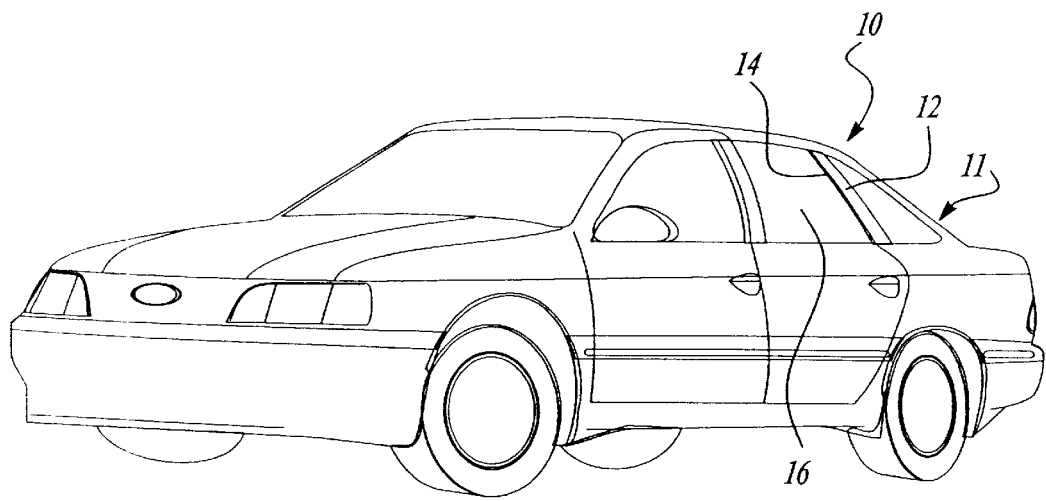
FIG. 1 is a perspective view of a glass panel assembly, according to the present invention, illustrated in operational relationship with a motor vehicle.
Figure 2:
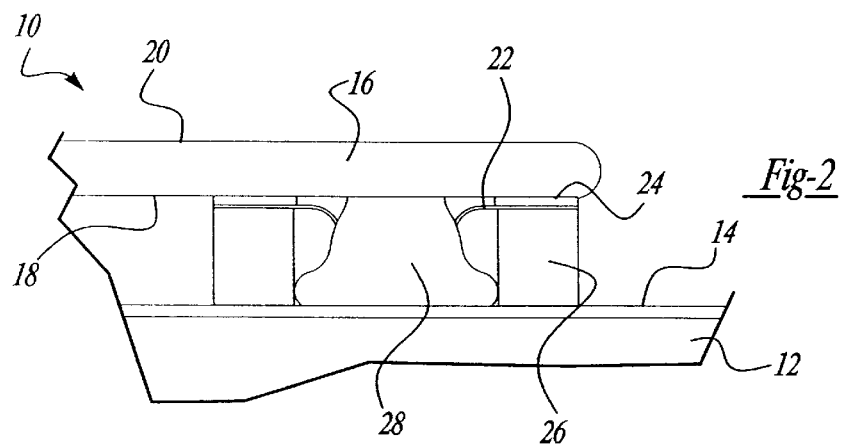
FIG. 2 is a fragmentary view of the glass panel mounting assembly of FIG. 1.

Referring now to the drawings and in particular FIGS. 1 and 2, one embodiment of a glass panel assembly 10, according to the present invention, is shown for a motor vehicle, generally indicated at 11. The glass panel assembly 10 is mounted to vehicle structure 12 surrounding an opening 14 of the motor vehicle 11. The glass panel assembly 10 can be employed to mount a glass panel at a number of places on the motor vehicle 11, including the front or rear doors or front or rear of the motor vehicle 11. To that end, the specific glass panel shown in FIG. 1 and FIG. 2 is for purposes of illustration and not by way of limitation.

The glass panel assembly 10 includes a glass panel 16. The glass panel 16 is generally planar and rectangular in shape. The glass panel 16 in made of a transparent material such as glass, plastic or the like. The glass panel 16 may have any suitable thickness such as five millimeters. The glass panel 16 has an inner surface 18 to face the interior of the motor vehicle 11 and an outer surface 20 to face outward of the motor vehicle 11. It should be appreciated that the glass panel 16 is conventional and known in the art.

The glass panel assembly 10 also includes a diaphragm or membrane 22 mounted to one side of the glass panel 16. The membrane 22 extends laterally and longitudinally about a perimeter of the glass panel 16. The membrane 22 is made of an elastic material which is impervious to water molecules for a function to be described. The membrane 22 also has a thickness in a range of approximately 0.002 inches to approximately 0.030 inches for a function to be described. Preferably, the membrane 22 has a thickness of approximately 0.005 inches for a function to be described.

The glass panel assembly 10 includes an adhesive 24 to temporarily hold or secure the membrane 22 to the glass panel 16. Preferably, the adhesive 24 is a fast acting adhesive such as a two part epoxy to secure lateral sides of the membrane 22 to the inner surface 18 of the glass panel 16. It should be appreciated that a portion of the membrane 22 between the lateral sides is not secured to the glass panel 16.

The glass panel assembly 10 also includes at least one, preferably a pair of spacers 26 connected to the membrane 22. The spacers 26 are generally rectangular in shape and extend along each lateral side of the membrane 22. The spacers 26 are made of an elastic material. Preferably, the spacers 26 are integral, unitary and formed as one-piece with the membrane 22. In another embodiment illustrated in FIG. 4, one of the spacers 26 may include a seal 27 extending laterally over an edge of the glass panel 16 to close a gap or space between the glass panel 16 and the vehicle structure 12. Preferably, the seal 27 is integral, unitary and formed as one-piece with the spacer 26. It should be appreciated that the spacers 26 may have any suitable shape. It should also be appreciated that the spacers 26 space the membrane 22 and glass panel 16 relative to a surface of the vehicle structure 12.

The glass panel assembly 10 further includes an adhesive 28 to secure the glass panel 16 directly to the vehicle structure 12. Preferably, the adhesive 28 is made of a room temperature vulcanizer (RTV) material such as a urethane material which polymerizes or cures in the presence of water molecules. The adhesive 28 is disposed between the glass panel 16 and membrane 22 in an uncured state according to a method to be described. When the membrane 22 is ruptured or severed, the adhesive 28 is exposed to water molecules and allowed to cure. It should be appreciated that the adhesive 28 is conventional and known in the art.

Figure 5:
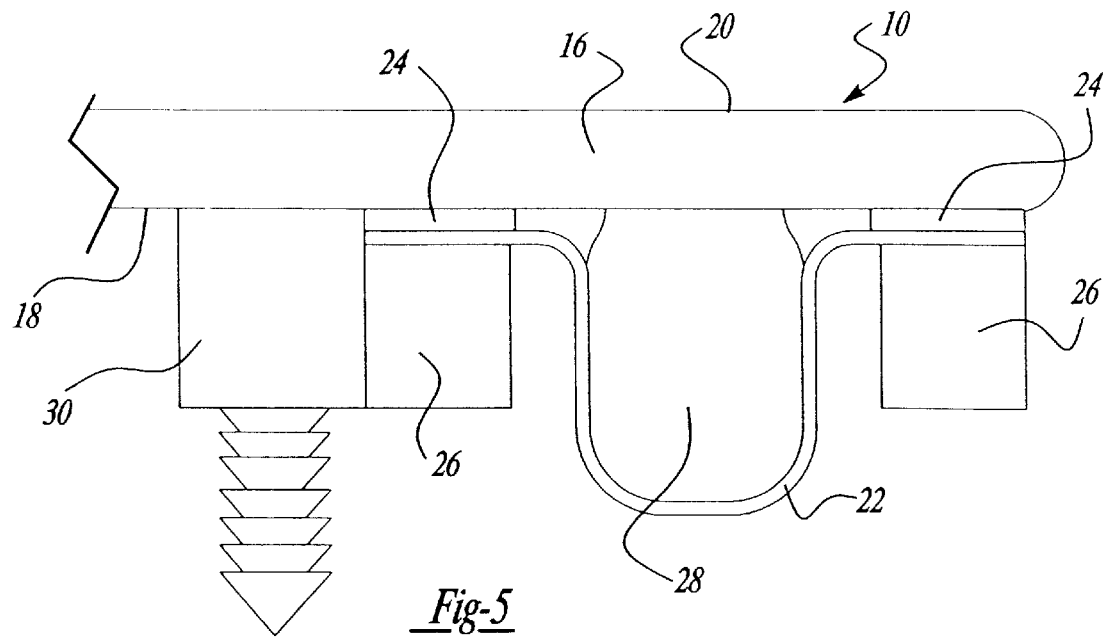
FIG. 5 is a fragmentary elevational view of yet another embodiment, according to the present invention, of the glass panel assembly of FIG. 2.

Referring to FIG. 5, the glass panel assembly 10 may include a member 30 attached to the glass panel 16 to locate the glass panel 16 relative to the vehicle structure 12. Preferably, the member 30 is a fastener such as of a Christmas tree or ratchet type and secured to the glass panel 16 by suitable means such as the adhesive 24 previously described. The member 30 extends through an aperture (not shown) in the vehicle structure 12 to locate the glass panel 16 and is secured therein. It should be appreciated that the member 30 is disposed in the aperture after the membrane 22 is ruptured and the adhesive 28 is exposed.

Figure 3A:
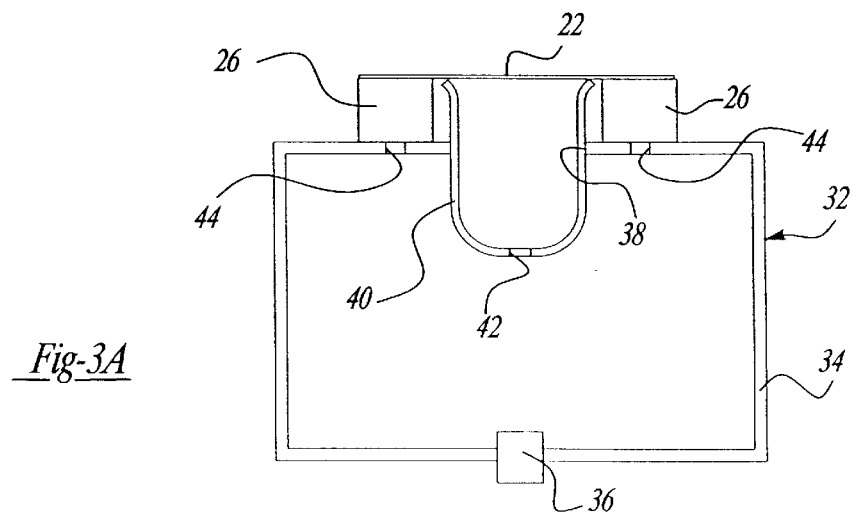

Referring to FIGS. 3A through 3E, a method, according to the present invention, is shown of making the glass panel assembly 10. As illustrated in FIG. 3A, the method includes the step of providing a frame, generally indicated at 32. The frame 32 includes a housing 34 having a generally rectangular shape and a generally rectangular cross-section. The housing 34 may be made of a rigid material such as metal or a flexible material such as a flexible plastic. The housing 34 is tubular and includes at least one aperture 36 extending though a bottom thereof and an aperture 38 extending through and along a top thereof. The frame 32 also includes a forming member 40 extending through and along the aperture 38. The forming member 40 has a general U or parabolic shape to form the membrane 22 to a desired shape. The forming member 40 also includes an aperture 42 extending therethrough for a function to be described. The housing 34 further includes at least one aperture 44 extending through the top thereof along each side of the forming member 40 for a function to be described.

The method also includes the step of providing the membrane 22 and the spacers 26 and disposing the membrane 22 across an open end of the forming member 22 and the spacers 26 over the apertures 44. As illustrated in FIG. 3B, the method includes the step of applying a vacuum to the frame 32 and forming the membrane 22 to the shape of the forming member 40. In this step, the aperture 36 is connected by a conduit (not shown) to a vacuum pump (not shown). The vacuum pump evacuates the air from an interior of the housing 34 through the aperture 36. As a result, the vacuum applies a suction through the apertures 44 to hold the spacers 26 against the housing 34 and through the aperture 42 to stretch the membrane 22 and hold it against the interior surface of the forming member 40. As a result, a membrane 22 having an original thickness of approximately 0.005 inches is stretched such that its center has a thickness of approximately 0.002 inches. It should be appreciated that the vacuum is indicated by the arrow A.

The method also includes the step of applying the adhesive 24 to the membrane 22 along the lateral edges at the top of the spacers 26. The adhesive 24 is applied after the membrane 22 is stretched.

As illustrated in FIG. 3C, the method includes the step of disposing the adhesive 28 on the membrane 22. In this step, the adhesive 28 is applied to the membrane 22 in a liquid or semi-liquid state by a robot (not shown) which opens a valve to allow the adhesive 28 to be disposed in the forming member 40 against the stretched membrane 22. The adhesive 28 is applied in an uncured state in an atmosphere of dry air such as nitrogen or an inert gas such as argon. It should be appreciated that the vacuum is continued to the frame 32 while the adhesive 28 is being applied.

As illustrated in FIG. 3D, the method includes the step of providing the glass panel 16 and disposing the glass panel 16 against the adhesive 24 to form the glass panel assembly 10. In this step, the adhesive 24 temporarily secures the membrane 22 to the glass panel 16 to hold the uncured adhesive 28 between the membrane 22 and glass panel 16. Since this step is also carried out in an atmosphere of a dry air, dry air 46 may be captured or trapped between the membrane 22 and glass panel 16. It should be appreciated that the vacuum is continued to the frame 32 during this step.

The method also includes the step of discontinuing the vacuum to the frame 32 and removing the glass panel assembly 10 from the frame 32. The glass panel assembly 10 is then preassembled and shipped to an assembly plant for installation or assembly to the motor vehicle 11 by a method to be described.

Figure 6A:
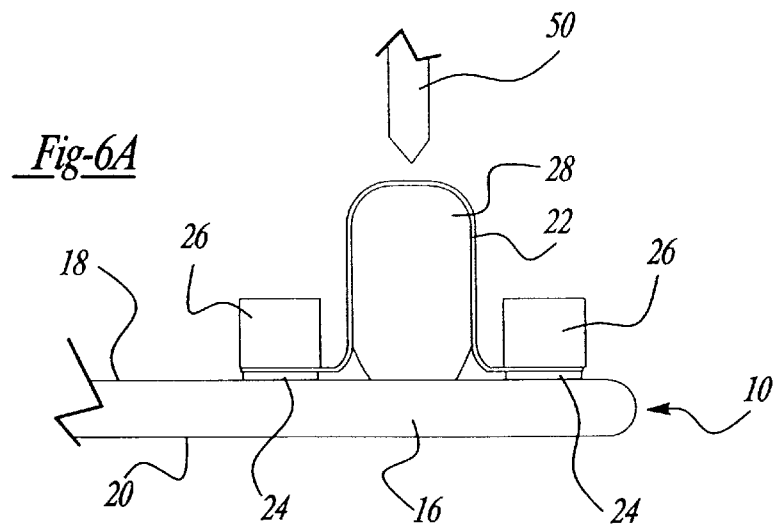
FIGS. 6A and 6B are elevational views of a method, according to the present invention, of assembly of the glass panel assembly.
Figure 6B:
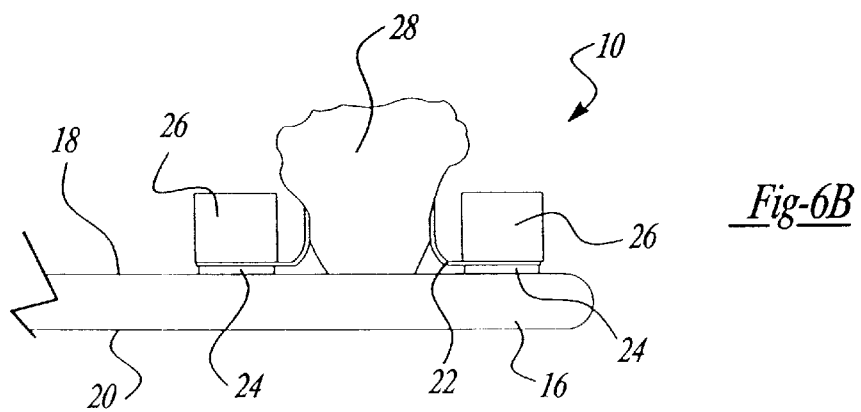

Referring to FIGS. 6A and 6B, a method, according to the present invention, of assembling the glass panel assembly 10 to the motor vehicle 11 is shown. The method includes the step of providing the glass panel assembly 10 having the glass panel 16, the membrane 22 mounted to one side of the glass panel 16 and the adhesive 28 disposed between the membrane 22 and the glass panel 16.

As illustrated in FIG. 6A, the method includes the step of rupturing or severing the membrane 22 to expose the adhesive 28. In this step, a tool 50 such as a knife or laser is used to cut the center of the membrane 22 along its length. Optionally, the membrane 22 may have a pair of laterally spaced ribs or projections (not shown) to ensure that the cut travels along the center of the membrane 22. As illustrated in FIG. 6B, the ruptured membrane 22 contracts to expose the adhesive 28. The method includes the step of disposing the glass panel assembly 10 in the opening 14 and against the vehicle structure 10 to allow the exposed adhesive to contact the vehicle structure 12 and secure the glass panel directly to the vehicle structure 12. It should be appreciated that the adhesive 28 is exposed to water molecules and cures to secure the glass panel 16 directly to the vehicle structure 12.

Thus, the glass panel assembly 10 uses urethane adhesive 28 along the edges of the glass panel 16 and is held in place by an elastic non-pervious membrane 22 in tension. The glass panel assembly 10 is prepped for installation simply by running a tool 50 over the membrane 22 to expose the urethane adhesive 28.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A glass panel assembly for a motor vehicle comprising
 a glass panel;
 a membrane having lateral sides secured to one side of said glass panel; and
 an adhesive disposed between said lateral sides of said membrane and contacting said membrane and said glass panel, wherein said membrane is ruptured to allow said adhesive to secure said glass panel directly to vehicle structure.

2. A glass panel assembly as set forth in claim 1 wherein said adhesive is urethane.

3. A glass panel assembly as set forth in claim 1 wherein said membrane is made of an elastic material.

4. A glass panel assembly as set forth in claim 3 wherein said membrane has a thickness in a range of approximately 0.002 inches to approximately 0.030 inches.

5. A glass panel assembly as set forth in claim 3 including a second adhesive to temporarily secure said membrane to said glass panel.

6. A glass panel assembly as set forth in claim 5 wherein said second adhesive is a two part epoxy.

7. A glass panel assembly as set forth in claim 1 including a member attached to said glass panel to locate said glass panel relative to the vehicle structure.

8. A glass panel assembly as set forth in claim 7 wherein said member is a fastener.

9. A glass panel assembly as set forth in claim 1 including a spacer connected to said membrane along each lateral side thereof.

10. A glass panel assembly as set forth in claim 1 wherein said membrane has a portion which extends over an edge of said glass panel to form a seal between said glass panel and the vehicle structure.

11. A glass panel assembly for a motor vehicle comprising:

a glass panel;

a membrane having lateral sides and disposed on one side of said glass panel;

an adhesive to secure said lateral sides of said membrane to said glass panel; and an uncured urethane disposed between and contacting said membrane and said glass panel, wherein rupture of said membrane allows said urethane to polymerize and secure said glass panel directly to vehicle structure.

12. A glass panel assembly as set forth in claim 11 wherein said membrane is made of an elastic material.

13. A glass panel assembly as set forth in claim 12 wherein said membrane has a thickness in a range of approximately 0.002 inches to approximately 0.030 inches.

14. A glass panel assembly as set forth in claim 11 wherein said adhesive is a fast acting adhesive to temporarily secure said membrane to said glass panel.

15. A glass panel assembly as set forth in claim 14 wherein said fast acting adhesive is a two part epoxy.

16. A glass panel assembly as set forth in claim 11 including a fastener attached to said glass panel to locate said glass panel relative to the vehicle structure.

* * * * *